United States Patent [19]

Watanabe

[11] Patent Number: 4,618,244

[45] Date of Patent: Oct. 21, 1986

[54] IMAGE FORMING APPARATUS CAPABLE OF SELECTIVELY OPTICALLY SCANNING ONE OR MORE DOCUMENTS TO BE COPIED DURING ONE SCANNING OPERATION

[75] Inventor: Junji Watanabe, Yokohama, Japan

[73] Assignee: Kabushiki Kaisha Toshiba, Kawasaki, Japan

[21] Appl. No.: 758,700

[22] Filed: Jul. 25, 1985

[30] Foreign Application Priority Data

Sep. 5, 1984 [JP] Japan .................. 59-185722

[51] Int. Cl.⁴ .................................. G03G 15/00
[52] U.S. Cl. .................... 355/8; 355/14 R; 355/14 SH; 355/3 R
[58] Field of Search ............... 355/14 R, 3 R, 14 SH, 355/8, 7, 40, 55, 77

[56] References Cited

U.S. PATENT DOCUMENTS

| | | | |
|---|---|---|---|
| 4,098,551 | 7/1978 | Komori et al. ............... | 355/3 R |
| 4,268,164 | 5/1981 | Yajima et al. ............... | 355/7 X |
| 4,299,475 | 11/1981 | Nagahara ..................... | 355/55 X |
| 4,303,332 | 12/1981 | Sakai ............................ | 355/7 X |
| 4,340,295 | 7/1982 | Nakamura .................... | 355/7 X |
| 4,422,751 | 12/1983 | Komiya et al. ............... | 355/7 X |

Primary Examiner—A. C. Prescott
Attorney, Agent, or Firm—Oblon, Fisher, Spivak, McClelland & Maier

[57] ABSTRACT

An image forming apparatus including a document table for holding a document placed thereon, an optical scanner movably provided along the document table to optically scan the document placed on the table, first and second indicators or scales provided at respective ends of the document table to indicate the allowable copy ranges, a designating device for designating a scanning area provided by placing the document on the document table in accordance with at least one of the first and second indicators, and a controller for controlling the movement of the optical scanner to scan the scanning area designated by the designating device. Two full-sized documents on the document table can be scanned during one scanning operation by the optical scanner, and a precise setting of the documents on the document table can be easily performed.

7 Claims, 11 Drawing Figures

IMAGE FORMING APPARATUS CAPABLE OF SELECTIVELY OPTICALLY SCANNING ONE OR MORE DOCUMENTS TO BE COPIED DURING ONE SCANNING OPERATION

BACKGROUND OF THE INVENTION

1. Field of the Invention

The present invention relates to an image forming apparatus in which an image of a document is optically scanned and the image is formed on a recording medium.

2. Discussion of Background

A conventional image forming apparatus or copying apparatus using an optical scanner accommodates only one document on the document table at a time, and copies the document only one frame a time by means of a single scanning operation. Therefore, in copying plural documents, the optical scanner must scan the documents on the document table plural times corresponding to the number of documents. Such repetitious scanning of documents is time-consuming and troublesome work.

SUMMARY OF THE INVENTION

Accordingly, an object of the present invention is to provide an image forming apparatus in which two documents on the document table can be scanned during one scanning operation by an optical scanner, and a precise setting of the documents on the document table can be easily performed.

To achieve the above object, there is a provided an image forming apparatus according to the invention including a document table for holding a document placed thereon, optical scanning means movably provided along the document table to optically scan the document placed on the document table, first and second indicating means provided at respective ends of the document table to indicate the allowable copy ranges, designating means for designating a scanning area provided by placing the document on the document table in accordance with the first and/or second indicating means, and means for controlling the movement of the optical scanning means to scan the scanning area designated by the designating means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 5:
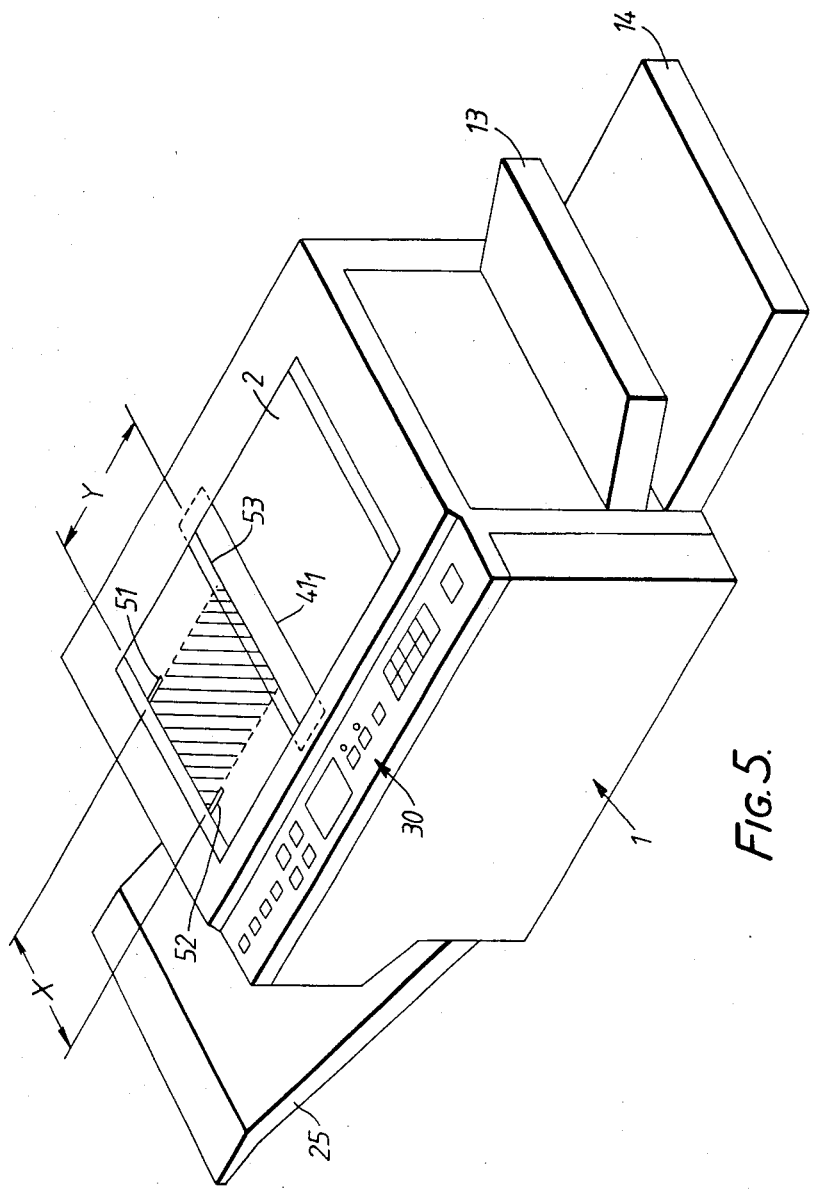
FIG. 5 is a perspective view showing the outer appearance of the embodiment shown in FIG. 1.
Figures 6, 7:
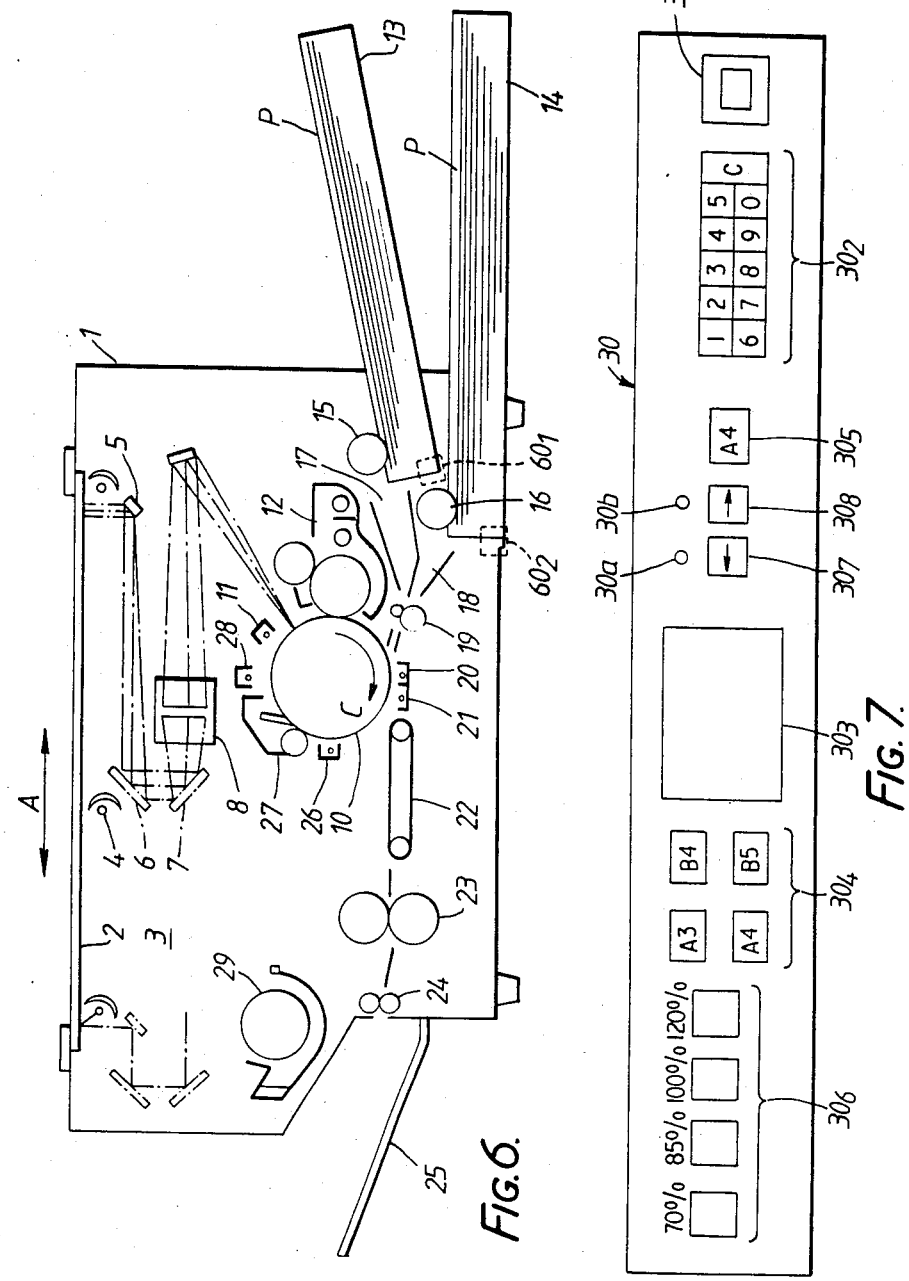
FIG. 6 is a schematic cross-sectional side view showing a section of the embodiment of the invention shown in FIG. 1.
FIG. 7 is a plan view showing an operation panel of the embodiment of FIG. 1.

Referring now to the drawings, wherein like reference numerals designate identical or corresponding parts throughout the several views, FIGS. 5 and 6 are schematic views of the image forming apparatus, for example an electrostatic copying apparatus, of the invention. A document table 2 made of transparent glass is fixed on an upper portion of a main body 1 for supporting a document. An optical scanner 3 is provided and reciprocatively moves in the direction of arrow A along a lower surface of document table 2. Scanner 3 includes an exposure lamp 4 to illuminate a document placed on table 2 and mirrors 5, 6 and 7 to reflect the light reflected from the document. When optical scanner 3 moves from the left side to right side in FIG. 6, optical scanner 3 optically scans the document placed on table 2. Mirrors 6 and 7 are moved at half the speed of exposure lamp 4 and mirror 5, whereby an optical path length from the document to a photosensitive drum 10, described later, is kept constant. The reflected light from the document is reflected by mirrors 5, 6 and 7 then passed through a copy magnification changing lens block 8. Further, the reflecting light is the reflected by a mirror 9, and led to the surface of photosensitive drum 10. At this time, photosensitive drum 10 is exposed to a slit of light.

Operation of the drum 10 is next described. First, drum 10 is charged by a charger 11 while drum 10 is rotated in the direction of arrow C. Then, drum 10 is illuminated with light reflected from the document to create an electrostatic latent image of the document on the surface thereof. The electrostatic latent image is then visualized by application thereto of toner from a developing unit 12. Then, either an upper cassette 13 or a lower cassette 14 is selected and copy sheets P contained therein are taken out sheet-by-sheet by means of a feed roller, either 15 or 16. Each sheet P is directed to a pair of aligning rollers 19 through a sheet guide 17 or 18, and then sheet P is fed to a transfer station. Cassettes 13 and 14 are removably inserted into the right lower portion of main body 1. One of cassettes 13 and 14 is selected by operation of an operation panel to be described later. Cassette size sensors $60_1$ and $60_2$ are provided in the insertion holes for cassettes 13 and 14. Cassette size sensors $60_1$ and $60_2$ each contain a plurality of microswitches which are turned on and off in response to the size of the inserted cassette.

Copy sheet P fed to the transfer station contacts with photosensitive drum 10. While contacting the drum 10, a charge transfer unit 20 applies charge to copy sheet P and the toner image is transferred from drum 10 onto copy sheet P. Copy sheet P with the transferred toner image is then separated from photosensitive drum 10 by a separating unit 21, and is transferred to a pair of fixing rollers 23 by a transfer belt 22. A pair of fixing rollers 23 apply heat and pressure to copy sheet P, thereby fixing the toner image. After fixing, copy sheet P is discharged to a tray 25 attached to the outside of main body 1 by a pair of discharge rollers 24. Photosensitive drum 10, after it is subjected to the toner image transfer process, reaches a charge remover 26. Charge remover 26 removes charges on photosensitive drum 10, then the residual toner on the surface of drum 10 is removed by a cleaner 27. Further, an after image (residual charge) is erased by a discharge lamp 28. At this point, drum 10 is returned to its initial state. A cooling fan 29 is provided near discharge roller pair 24 to prevent an excessive temperature rise in main body 1.

FIG. 7 shows an operation panel 30 provided on the upper surface of main body 1. Panel 30, as shown, includes a copy button $30_1$ for starting the copying operation, ten keys $30_2$ for setting a desired number of copies, a display $30_3$ for displaying states of the copying operation or jammed copy sheets, select keys $30_4$ for selecting copy sheets of a desired size and a size display $30_5$ for displaying a selected copy sheet size arranged on the panel. On the left side of the panel, copy magnification select keys $30_6$ are arranged for selecting copy magnifications of enlargement or reduction. Between display $30_3$ and size display $30_5$, scan direction designating keys $30_7$ and $30_8$ are arranged for designating the scanning direction of optical scanner 3 (i.e., moving direction of a first carriage $41_1$ to be described later) and LEDs (Light Emitting Diode) $30a$ and $30b$ are provided on the upper side of designating keys $30_7$ and $30_8$ to display the designation made by designating keys $30_7$ or $30_8$. In the case that main body 1 has applied thereto electric power and is in the normal mode, designating key $30_7$ is selected automatically and LED $30a$ is lit up.

Figure 8:
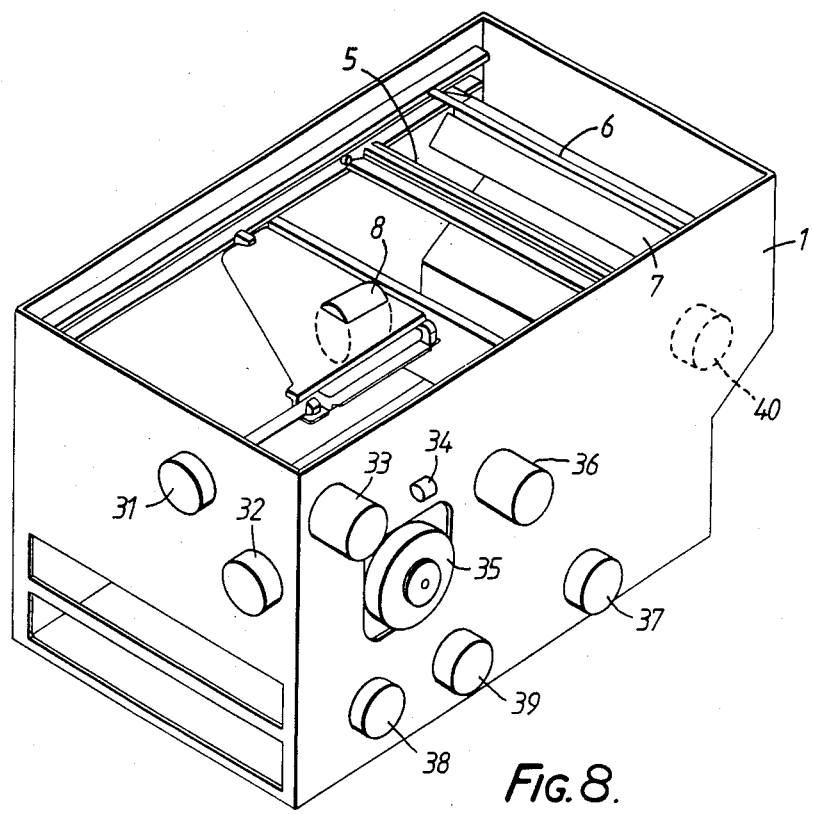
FIG. 8 is a perspective view showing driving portions of the embodiment of the invention of FIG. 1.

FIG. 8 shows an allocation of drive sources which are made of pulse motors. The drawing of FIG. 8 is depicted as if viewed from the rear side of the copying apparatus, while the FIG. 5 drawing shows the front side of the copying apparatus. A magnification changing motor 31 is provided for changing the location of copy magnification changing lens block 8. A motor 32 changes the distance (optical path) between mirror 5 and mirror pair 6 and 7 when the copy magnification is changed. A scanning motor 33 moves exposure lamp 4 and mirror 5 and mirror pair 6 and 7 for scanning the document. A shutter motor 34 moves the shutter (not shown) to adjust the charging width of the charge on photosensitive drum 10 which is formed by the charger 11 when the copy magnification is changed. A developing motor 35 drives the developing roller of developing unit 12. A drum motor 36 drives photosensitive drum 10. A fixing motor 37 drives transfer belt 22, fixing roller pair 23 and discharge roller pair 24. A paper feed motor 38 drives feed rollers 15 and 16. A paper feed motor 39 drives aligning roller pair 19. A fan motor 40 drives cooling fan 29.

Figure 9:
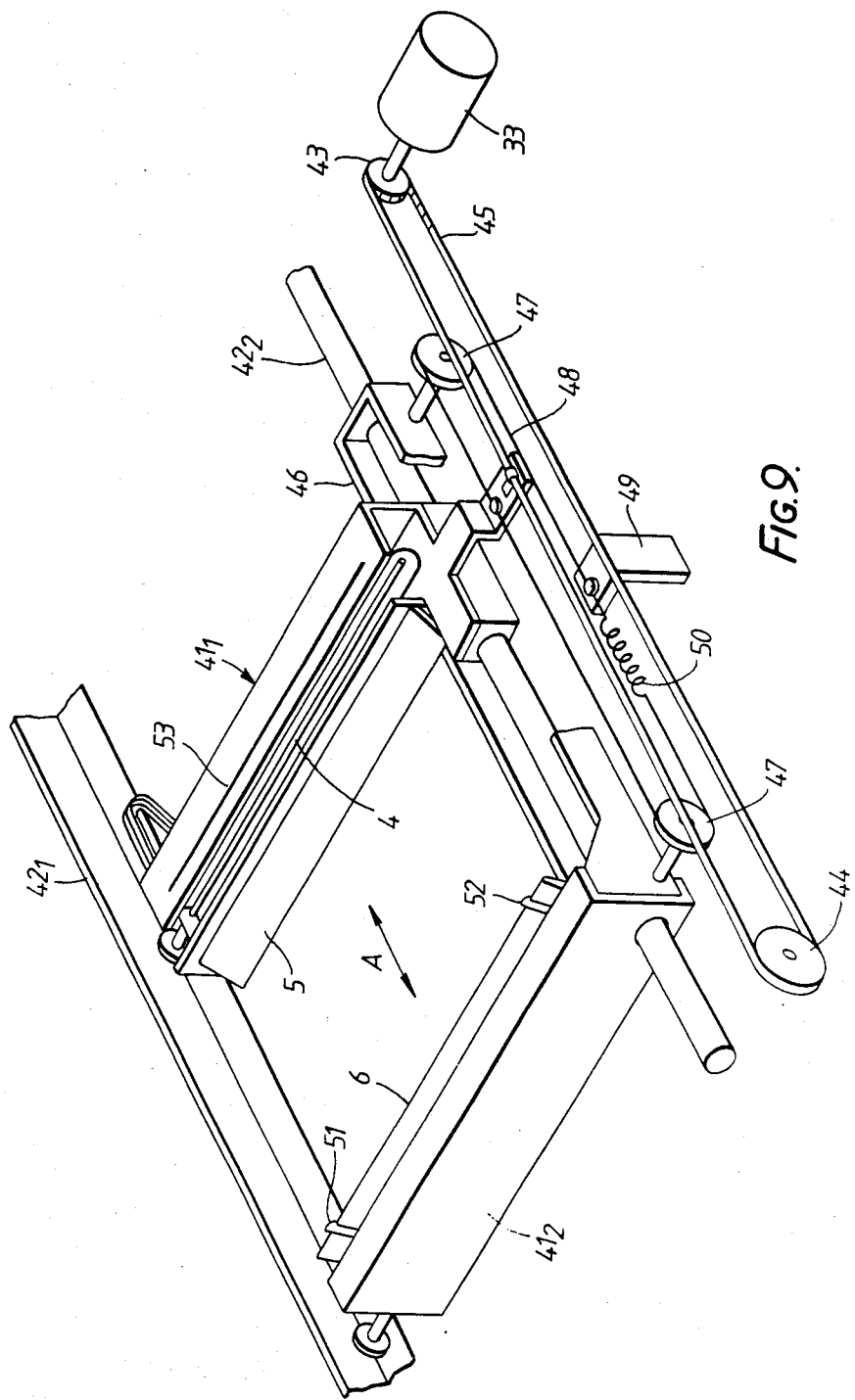
FIG. 9 is a perspective view of a scanning mechanism for moving an optical scanner in the embodiment of FIG. 1.

FIG. 9 shows a scanning mechanism for moving the optical scanner formed of exposure lamp 4 and mirrors 5, 6 and 7 along document table 2. Mirror 5 and exposure lamp 4 are supported by a first carriage $41_1$, and mirrors 6 and 7 are supported by a second carriage $41_2$. These carriages $41_1$ and $41_2$ can move in the direction of the arrow A along guide rails $42_1$ and $42_2$. Scanning motor 33 has a 4-phase pulse motor which drives a pulley 43. An endless belt 45 is wound around this pulley 43 and an idle pulley 44. First carriage $41_1$ supporting mirror 5 is fixed at one end to the midportion of endless belt 45. A couple of rotatable pulleys 47 and 47 are mounted to a guide 46 of second carriage $41_2$. A wire 48 is wound around pulleys 47 and 47. One end of wire 48 is fixed to a fixing piece 49, while the other end is fixed to fixing piece 49 via a coiled spring 50. One end of first carriage $41_1$ is fixed to the mid-portion of wire 48. With the rotation of pulse motor 33, belt 45 rotates causing first carriage $41_1$ to move. In turn, second carriage $41_2$ also moves. As this time, pulleys 47 and 47 serve as a fall block. Therefore, second carriage $41_2$ moves at half of the speed of first carriage $41_1$ while traveling in the same direction as first carriage $41_1$. The moving direction of first and second carriage $41_1$ and $41_2$ can be changed by reversing the rotating direction of pulse moter 33.

When the enlargement or reduction copy is established, the allowable copy ranges are indicated on document table 2 corresponding to designated size of the copy sheets. Namely, if Px and Py mean size of copy sheets selected by select keys $30_4$ and K means copy magnifications selected by copy magnification select keys $30_6$, copy allowable ranges X and Y can be expressed as follows.

$$X = Px/K$$

$$Y = Py/K$$

X is indicated by indicators 51 and 52 provided under the transparent glass of document table 2 and Y is indicated by a scale 53 provided on the upper surface of first carriage $41_1$ as shown in FIG. 5.

Figure 10:
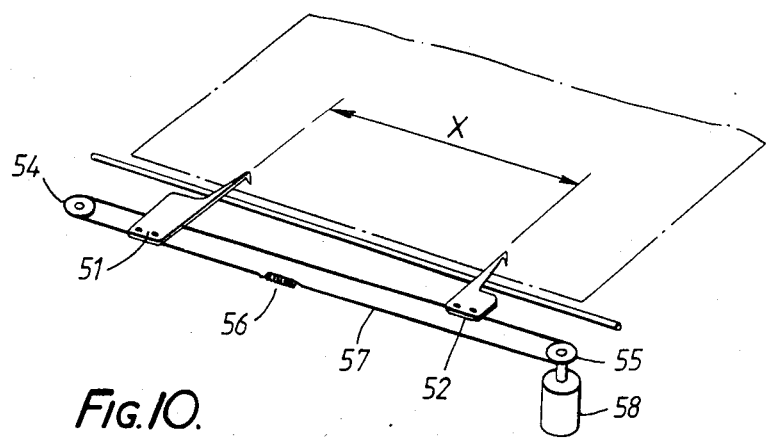
FIG. 10 is a perspective view of a driving mechanism for moving indicators in the embodiment of FIG. 1.

As shown in FIG. 10, indicators 51 and 52 are fixed to a wire 57 wound around pulleys 54 and 55 via a coiled spring 56. Pulley 55 is rotated by a motor 58. When motor 58 drives pulley 55, the distance between indicator 51 and indicator 52 is varied in accordance with the copy magnification. Scale 53 (shown in FIGS. 5 and 9) provided on first carriage $41_1$ is moved to a desired position (a home postion) in accordance with the copy sheet size and copy magnification by driving motor 33.

Figure 11:
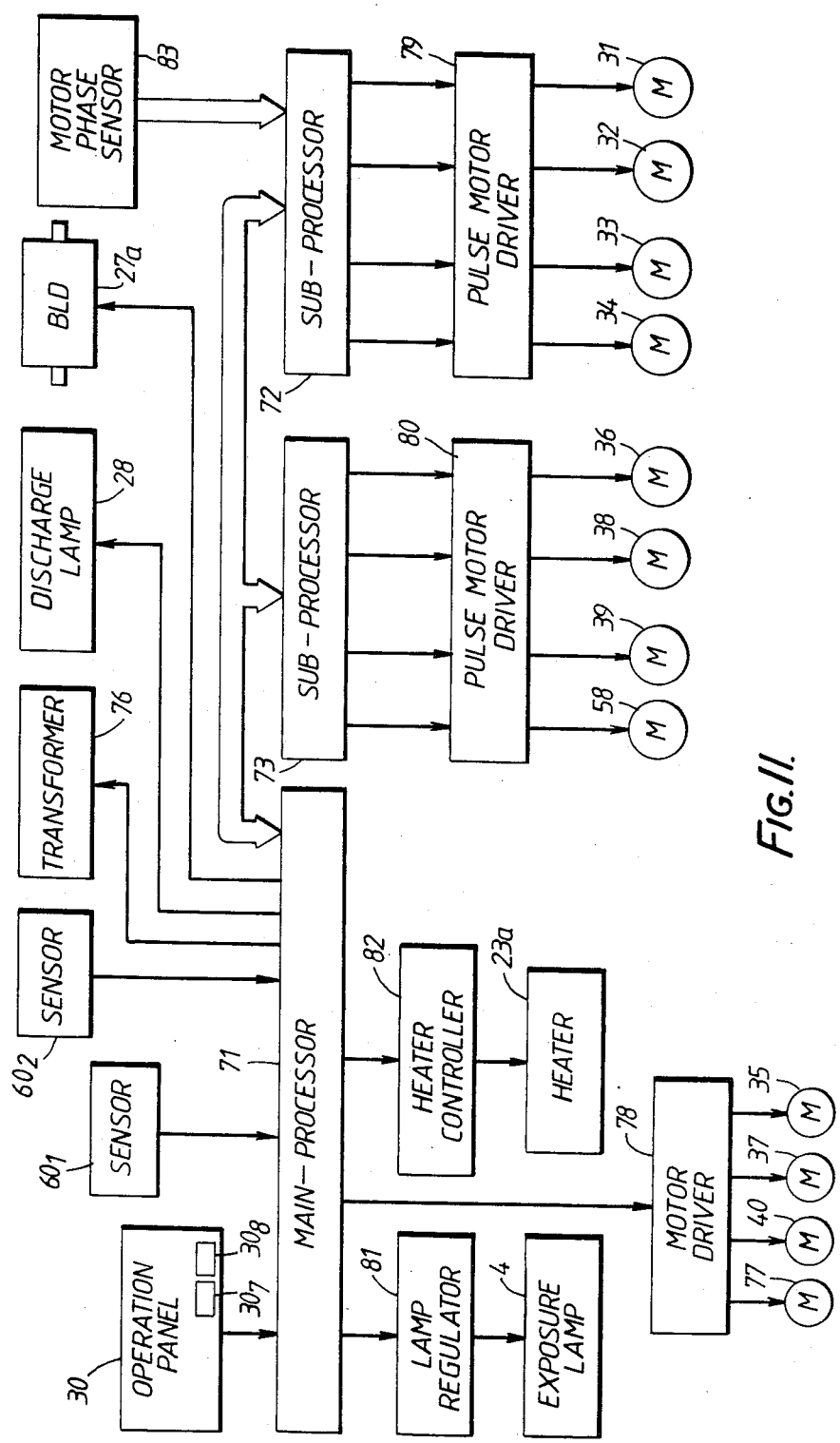
FIG. 11 is a block diagram showing the overall control system for the embodiment of FIG. 1.

FIG. 11 shows the overall control system of the present invention. This control system includes a main processor 71, and first and second sub-processors 72 and 73. Main processor 71 detects signals from operation panel 30 and cassette size sensors $60_1$ and $60_2$, and controls a high voltage transformer 76 for supplying high voltage to the various charging units, discharge lamp 28, a solenoid (BLD) 27a for actuating a cleaning blade of cleaner 27, a heater 23a of fixing roller pair 23, exposure lamp 4 and motors 31-40 and 58. Of the motors 31-40 and 58, motors 35, 37, 40 and a motor 77 for supplying toner to developing unit 12 are controlled by main processor 71 through a motor driver 78. Motors 31-34 are controlled by first subprocessor 72 through a pulse motor driver 79. Motors 36, 38, 39 and 58 are controlled by second subprocessor 73 through a pulse motor driver 80. Exposure lamp 4 is controlled by main processor 71 through a lamp regulator 81. A heater 23a is controlled by main processor 71 through a heater controller 82. Main processor 71 sends motor drive and stop commands to first and second sub-processors 72 and 73. These sub-processors 72 and 73 send status signals representing the drive and stop of motors to main processor 71. First sub-processor 72 is supplied with position data from a motor phase sensor 83 for detecting the initial position of each of motors 31-34.

Figure 1:
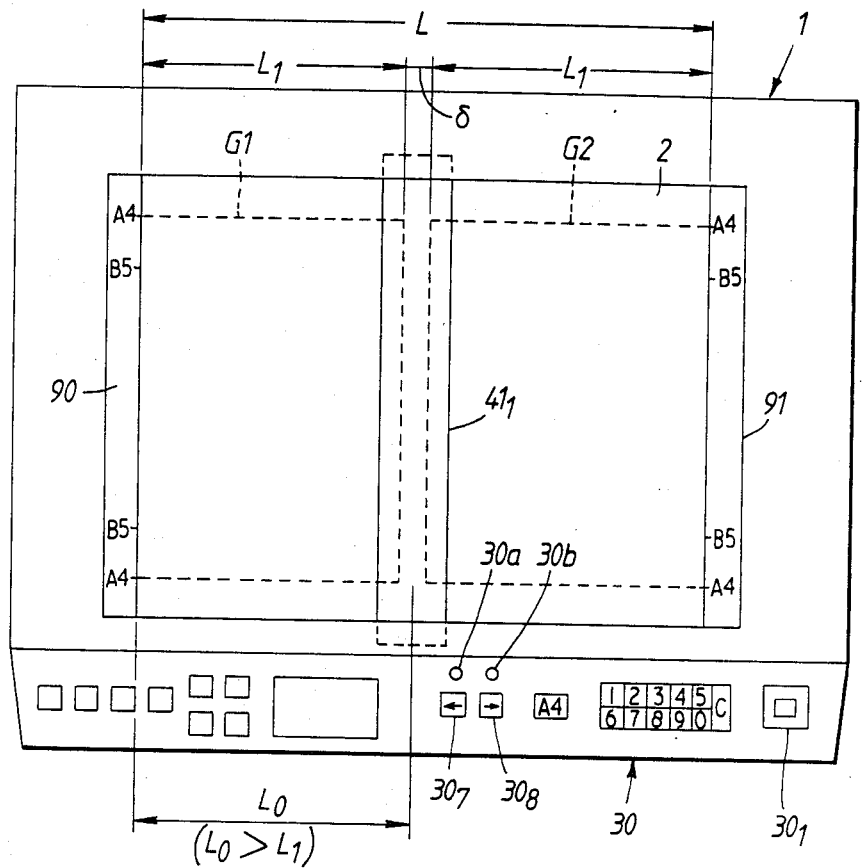
FIG. 1 is a plan view showing one embodiment of an image forming apparatus according to the present invention.

The essential parts of the present invention will next be described. As shown in FIG. 1, scales 90 and 91 indicate locations of placing the documents at respective ends of document table 2. Each of scales 90 and 91 is marked with "A4" (210×297 mm) and "B5" (182×257 mm) indicating the upper and lower limits of the copy allowable ranges. The length L between scale 90 and scale 91 is set to a size slightly longer than the maximum size of documents (e.g. A3 size: 297×420 mm or LEDGER size: 11×17 inches). L1 is a width represents a half of the maximum size of the documents, namely L1 represents a width of A4 size: 210×297 mm or LETTER size: 8½×11 inches. A relation between L and L1 is as follows:

$$L = L1 + L1 + \delta \ (\delta \geq 0)$$

In the case of actually making a copy, first carriage $41_1$ is located at a middle portion between scale 90 and scale 91. Namely, a length $L0 \simeq L/2$ represents a home position of first carriage $41_1$. Documents G1 and G2 are placed along scales 90 and 91, respectively of the table as shown in FIG. 1. As discussed hereinafter, documents G1 and G2 will be called the left document G1 and the right document G2, respectively.

Figure 2:
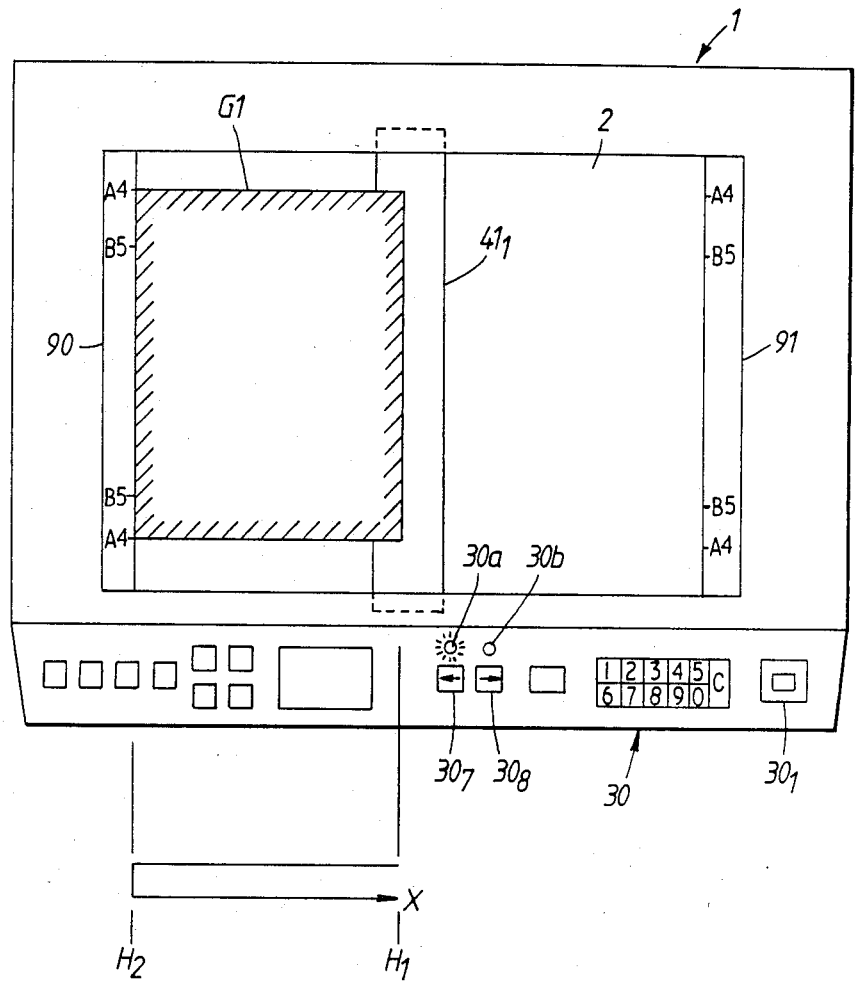
FIGS. 2–4 are respective views for explaining operation of the embodiment shown in FIG. 1.

The copying operation in the case of left document G1 placed on table 2 will be described with the aid of FIG. 2. In this case, scan direction designating keys $30_7$ is depressed, whereby LED $30a$ is lit. In this state, when copy button $30_1$ is depressed, first carriage $41_1$ moves from a point H1 to a point H2 which is very close to scale 90, as shown by the arrow X. Upon turning point H2, the exposure lamp 4 provided on first carriage $41_1$ is energized and thereby produces exposing light. Then first carriage $41_1$ moves from the point H2 to the point H1, whereby left document G1 is optically scanned. In finished the optical scanning, exposure lamp 4 is de-energized and first carriage $41_1$ stops at the home position in the middle portion of document table 2.

Figure 3:
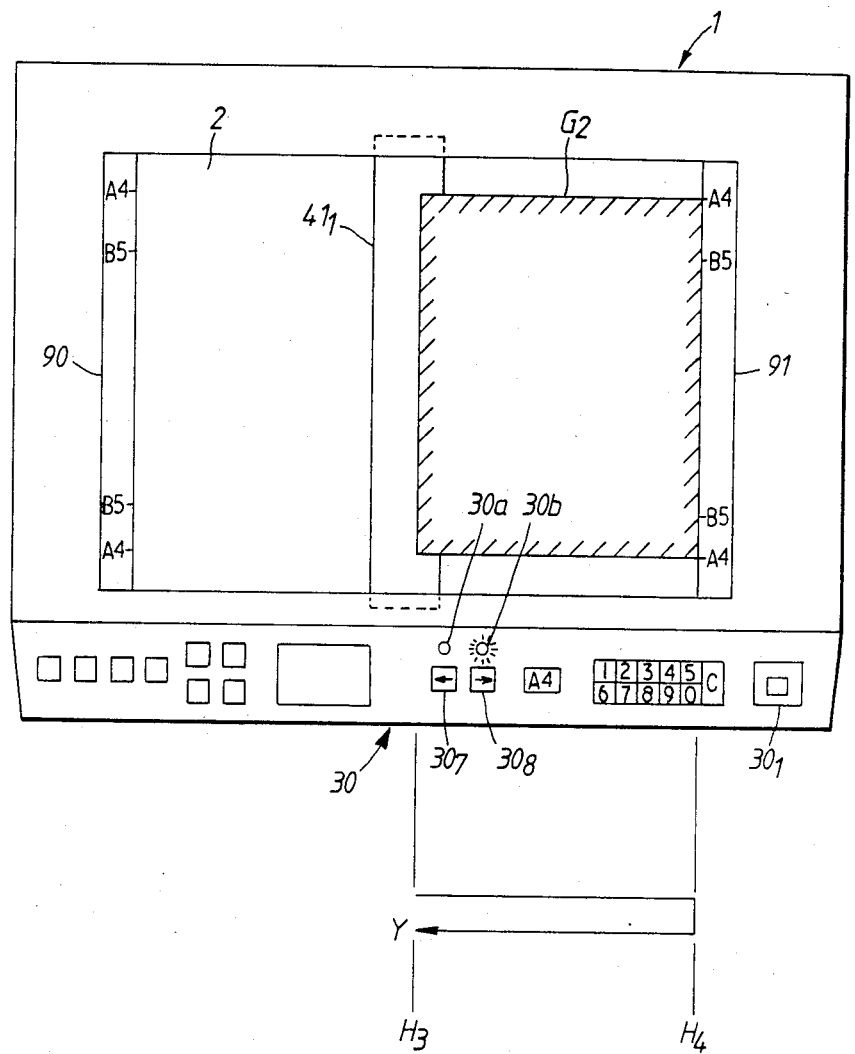

FIG. 3 shows the state when a right document G2 is placed along scale 91 of table 2. In this case, scan direction designating key $30_8$ is depressed, whereby LED $30b$ is lit. In this state, when copy button 30 is depressed, exposure lamp 4 provided on first carriage $41_1$ is energized. Then first carriage $41_1$ moves from a point H3 to a point H4 which is very close to scale 91, as shown by the arrow Y, whereby right document G2 is optically scanned. When first carriage $41_1$ reaches point H4, optical scanning is finished. At this time, exposure lamp 4 is de-energized, then first carriage $41_1$ is returned to the home position in the middle portion of document table 2.

Figure 4:
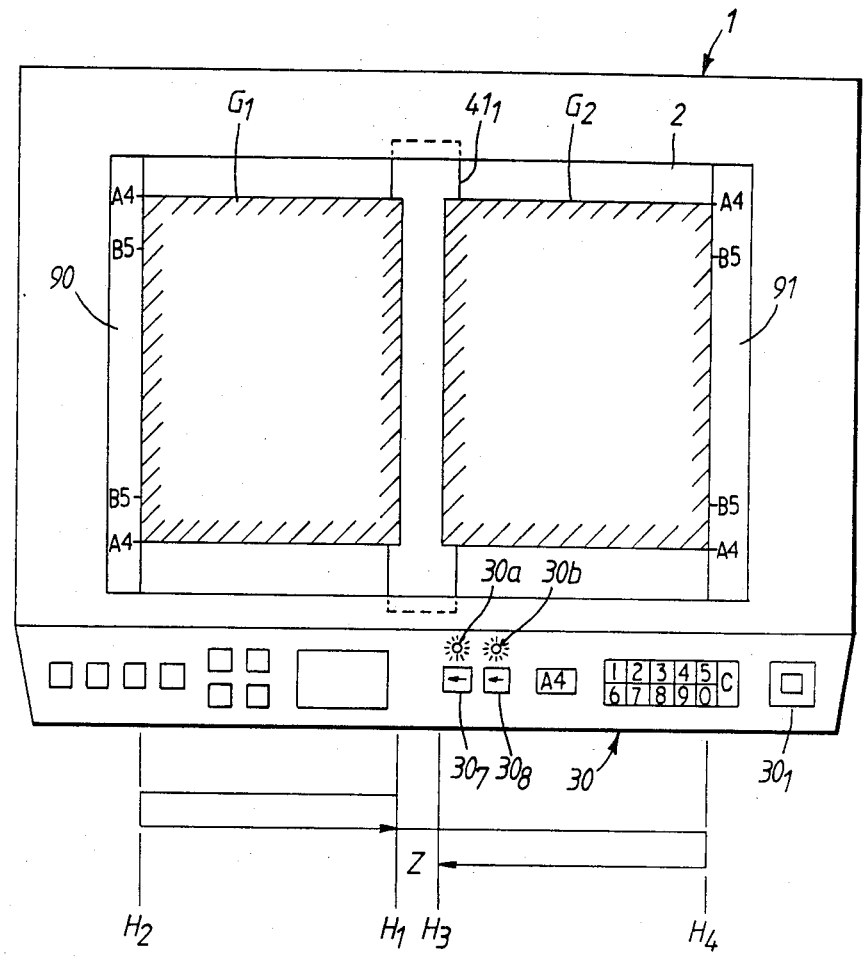

FIG. 4 shows a state where both the left and right documents G1 and G2 are placed along scales 90 and 91, respectively, of table 2. In this case, both of the scan direction designating keys $30_7$ and $30_8$ are depressed, whereby LEDs $30a$ and $30b$ are lit. In this state, when copy button $30_1$ is depressed, first carriage $41_1$ moves from the point H1 towards scale 90, as shown by the arrow Z. When first carriage $41_1$ reaches the point H2 which is very close to scale 90, exposure lamp 4 is energized. Then, first carriage $41_1$ moves from the point H2 to H1, whereby the left document G1 is optically scanned. The optical scanning of left document G1 is then finished, and then first carriage $41_1$ moves from the point H3 to H4 which is very close to scale 91 for optical scanning of the right document G2. At point H4, optical scanning of documents G1 and G2 is finished. After that, exposure lamp 4 is de-energized, and first carriage $41_1$ is returned to the home position H1.

While first carriage $41_1$ moves from the point H1 to H3 after the optical scanning and copying of the left document G1, a copy sheet is taken out from cassettes 13 or 14 and aligned by aligning roller 19. The copy sheet is transported to photosensitive drum 10. A toner image corresponding to right document G2 is transferred from drum 10 to the copy sheet upon the optical scanning by moving first carriage $41_1$ from the point H3 to H4.

If the gap size $\delta$ between the point H1 and H3 is small, the moving of first carriage $41_1$ is decelerated or stopped in between H1 and H3 so that the movement of first carriage $41_1$ from H3 to H4 coincides with the timing of copy sheet feeding.

As described above, first carriage $41_1$ is able to scan the document due to first carriage $41_1$ moving from middle portion of document table 2 in both the left and right directions. Therefore, two documents placed on document table can be copied by only one optical scanning operation. As a result, the copy speed can be improved.

As scales 90 and 91 are provided at respective ends of document table 2, a precise setting of both documents on document table 2 can be easily performed.

Further, as first carriage $41_1$ is standing by at the middle portion of document table 2, first carriage $41_1$ is able to scan the document quickly even if only one document is placed on the left or right portion of document table 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus comprising:
    a document table having plural document holding areas capable of holding plural documents selectively placed on respective of said holding areas;
    optical scanning means movably provided along said document table to optically scan documents placed on selected of said holding areas;
    plural indicating means respectively corresponding to said plural holding areas provided at the respective holding areas to indicate allowable copy ranges;
    designating means for selecting any number of said plural holding areas to be scanned so that any documents placed on said plural holding areas in relation to said respective plural indicating means are scanned;
    means for controlling the movement of said optical scanning means to optically scan only the holding areas selected by means of said designating means;
    means for producing respective copies of each document placed on a selected holding area selectively scanned by said optical scanning means.

2. An image forming apparatus according to claim 1, wherein:
    said document table comprises first and second holding areas each having dimensions to allow a respective document of a predetermined size to be placed thereon; and
    said indicating means comprising first and second indicators respectively corresponding to said first and second holding areas.

3. An image forming apparatus according to claim 2, wherein said first and second indicators include marks which represent the size of documents.

4. An image forming apparatus according to claim 2, comprising:
   means for setting said optical scanning means at a home position midway between said first and secod indicators.

5. An image forming apparatus according to claim 4, wherein said controlling means comprising:
   means for controlling said optical scanning means to move from the home position to said first or second indicators.

6. An image forming apparatus according to claim 4, wherein said controlling means comprises:
   means for controlling said optical scanning means to move from the home position to said first indicator and then to move from said first indicator to said second indicator.

7. An image forming apparatus according to claim 1, wherein said designating means comprises:
   first and second switch means for designating first and second holding areas to be scanned by said optical scanning means.

* * * * *